(12) United States Patent
Woodward et al.

(10) Patent No.: US 11,686,912 B1
(45) Date of Patent: Jun. 27, 2023

(54) OPTICAL FIBER ASSEMBLIES FOR ACCOMMODATING MINI DUPLEX CONNECTORS

(71) Applicant: DMSI International, Venice, FL (US)

(72) Inventors: Brandon Woodward, Venice, FL (US); Robert Brewster, Ellijay, GA (US)

(73) Assignee: DMSI INTERNATIONAL, Venice, FL (US)

( * ) Notice: Subject to any disclaimer, the term of this patent is extended or adjusted under 35 U.S.C. 154(b) by 0 days.

(21) Appl. No.: 17/396,336

(22) Filed: Aug. 6, 2021

Related U.S. Application Data

(60) Provisional application No. 63/061,938, filed on Aug. 6, 2020.

(51) Int. Cl.
*G02B 6/44* (2006.01)

(52) U.S. Cl.
CPC ......... *G02B 6/4455* (2013.01); *G02B 6/4471* (2013.01)

(58) Field of Classification Search
CPC ............................ G02B 6/4455; G02B 6/4471
See application file for complete search history.

(56) References Cited

U.S. PATENT DOCUMENTS

| | | | |
|---|---|---|---|
| 5,363,465 A | 11/1994 | Korkowski et al. | |
| 6,824,312 B2 | 11/2004 | McClellan et al. | |
| 6,920,274 B2 | 7/2005 | Rapp et al. | |
| 8,059,932 B2 | 11/2011 | Hill et al. | |
| 8,184,938 B2 | 5/2012 | Cooke et al. | |
| 8,705,928 B2 | 4/2014 | Zimmel et al. | |
| 8,712,206 B2 | 4/2014 | Cooke et al. | |
| 9,435,975 B2 | 9/2016 | Ott | |
| 9,599,785 B2 | 3/2017 | Xu et al. | |
| 9,933,588 B2* | 4/2018 | Woodward | G02B 6/4471 |
| 10,126,514 B2 | 11/2018 | Cooke et al. | |
| 10,185,108 B2 | 1/2019 | Fontaine | |
| 10,215,944 B2* | 2/2019 | Sedor | G02B 6/4455 |
| 10,444,456 B2 | 10/2019 | Cooke et al. | |
| 10,488,611 B2 | 11/2019 | Fontaine | |
| 10,809,479 B2 | 10/2020 | Crawford et al. | |

* cited by examiner

*Primary Examiner* — Sung H Pak
(74) *Attorney, Agent, or Firm* — Suiter Swantz pc llo

(57) ABSTRACT

Disclosed are fiber optic assemblies for handling mini duplex connectors (MDC) including a rack-mountable chassis, independent sliding trays disposed in the chassis, and a plurality of MDC modules removably installable in the sliding trays. Each MDC module includes protruding features configured to interact with tray guides having corresponding features that permit vertical installation of the modules in the trays while preventing horizontal translation and rotational motion of the installed MDC modules. MDC modules may have various configuration, for instance MTP module, patching module and pre-terminated tailed module configurations. The assemblies and components disclosed herein maximize connections densities of MDC connectors while improving access thereto in high density applications.

17 Claims, 18 Drawing Sheets

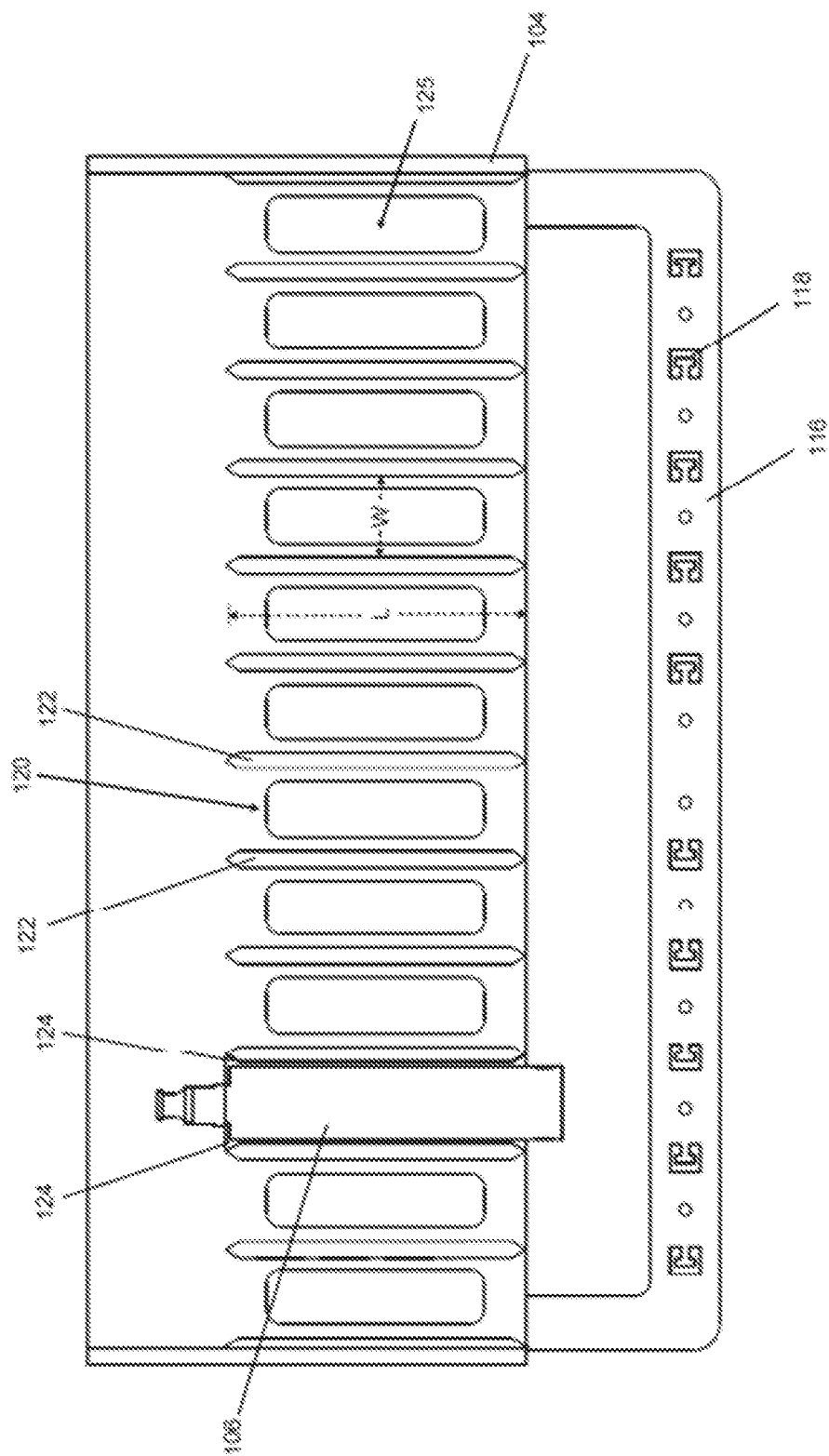

OPTICAL FIBER ASSEMBLIES FOR ACCOMMODATING MINI DUPLEX CONNECTORS

RELATED APPLICATION AND INCORPORATION BY REFERENCE

This Application claims the benefit of priority of U.S. Provisional Patent Application No. 63/061,938 filed Aug. 6, 2020, which is incorporated herein by reference in its entirety.

TECHNICAL FIELD AND BACKGROUND

The present disclosure relates to fiber optic equipment for use with fiber optic connectors, particularly modules, trays, chassis and assemblies for accommodating mini duplex fiber optic connectors (MDC) and corresponding MDC adapters.

New types of optical connectors are continuously being developed to maximize the density of optical connections. In that regard, the mini duplex connector (MDC) is a new two-fiber connector available from US Conec of Hickory, N.C. Referring to prior art FIG. 8, the MDC connector is a small form-factor optical fiber connector designed to provide, for instance, four separate two-fiber connections into a quad small form-factor pluggable (QSFP) footprint, and two separate two-fiber connections into a small form-factor (SFP) footprint. Each MDC connector contains two 1.25 mm diameter industry-standard LC ferrules, and can be installed on a 2.0 mm or less outer diameter optical cable. A push-pull boot allows for simple insertion and removal of the MDC connectors to and from corresponding receptacles, for instance, the respective four port and two port adapters shown in prior art FIGS. 9A and 9B. Insertion and removal of the MDC connector occurs with a simple push or pull on a flexible and robust strain relief boot providing functional density in tight spaces.

With the advent of new optical connectors comes the need for new hardware and equipment for handling such connectors to further maximize the density of optical connections, as well as provide ready access to the connectors to facilitate connector insertion and removal. The present disclosure therefore provides hardware and equipment solutions for MDC connectors.

BRIEF SUMMARY

To achieve the foregoing and other advantages, in a first aspect the present disclosure provides a fiber optic assembly for mounting in a rack. The assembly includes a chassis having a top, a bottom, and opposing sidewalls forming an interior space, the interior space accessible through at least a front opening of the chassis, and a pair of elongate guide tracks provided in the interior space and affixed to the opposing sidewalls. The assembly further includes a tray disposed in the interior space and slidably engaging the pair of elongate guide tracks such that the tray is configured to horizontally translate relative to the chassis between a first position and at least one second position, the tray having a plurality of mini duplex connector (MDC) module receiving spaces each formed between adjacent ones of guides extending upwardly from a floor of the tray. The assembly further includes an MDC module removably installable in one of the plurality of MDC module receiving spaces from above, the MDC module having protruding module features provided near a forward end and a back end thereof for interacting with corresponding guide features formed on respective adjacent ones of the guides forming the MDC module receiving space, the protruding module features and the corresponding guide features preventing, when the MDC module is installed in the respective MDC module receiving space, horizontal translation, lateral translation, and rotational movement of the MDC module relative to the tray.

In some embodiments, each of the protruding module features includes an outwardly tapering feature and each of the corresponding guide features comprises an inwardly tapering feature, or vice versa.

In some embodiments, wherein when the MDC module is installed in the respective MDC module receiving space, movement of the MDC module relative to the tray is prevented in all directions with the exception of vertical translation.

In some embodiments, the chassis further includes an access door hingedly coupled near the front of the chassis, the access door configured to be swung open in a downward direction to clear the front opening, and wherein the access door is held in a closed condition against a front face of the chassis via at least one of a mechanical coupling and a magnetic coupling.

In some embodiments, the tray includes a handle formed at a forward end of the tray, the handle spaced apart from the floor of the tray, and the handle configured to move the tray between the first position and the at least one second position.

In some embodiments, the first position corresponds to an operative position in which the MDC module is positioned substantially within the interior space of the chassis, and the at least one second position corresponds to an access position in which at least a portion of the MDC module is positioned outside of the interior space of the chassis.

In some embodiments, the MDC module includes a housing having a front, a back, a bottom, a top and opposing sidewalls forming an interior space, at least one MDC adapter disposed in a front opening formed in the front of the housing, at least one opening formed in the back of the housing, and a cover removably attachable to the top of the housing for accessing the interior space of the housing.

In some embodiments, the MDC module further includes one of a multi-fiber adapter, a cable clamp, and a cable retention feature disposed in the at least one opening formed in the back of the housing.

In some embodiments, the assembly includes a plurality of the pairs of elongate guide tracks provided in the interior space and affixed to the opposing sidewalls, the plurality of pairs of elongate guide tracks arranged in a vertical stack, a plurality of the trays disposed in the interior space, wherein each of the plurality of trays slidably engages one of the plurality of pairs of elongate guide tracks, and wherein each of plurality of trays is independently horizontally translatable relative to the chassis, and a plurality of the MDC modules removably installable in one of the plurality of MDC module receiving spaces from above.

In another aspect, the present disclosure provides a mini duplex connector (MDC) module for removable installation in an MDC module receiving space formed in a tray. The MDC module includes a housing having a front, a back, a bottom, a top and opposing sidewalls forming an interior space, at least one MDC adapter disposed in a front opening formed in the front of the housing, at least one opening formed in the back of the housing, a cover removably attachable to the top of the housing for accessing the interior space of the housing, and a plurality of protruding module features for interacting with guide features of guides of the tray. The plurality of protruding module features permit vertical installation of the MDC module in the MDC module receiving space, and prevent, when the MDC module is installed in the MDC module receiving space, each of horizontal translation, lateral translation, and rotational movement of the MDC module relative to the tray.

In some embodiments, each of the protruding module features includes an outwardly tapering feature positioned proximate one corner of the housing.

In some embodiments, the MDC module includes four protruding module features positioned proximate four corners of the housing, each of the four protruding module features tapering outward away from a respective one of the opposing sidewalls such that a middle portion of the housing inward of the front and back ends of the housing is narrower than each of the front and back ends of the housing at the position of the four protruding module features.

In some embodiments, the plurality of protruding module features includes first module features positioned along opposing sides of the housing proximate the front of the housing, and second module features positioned along opposing sides of the housing proximate the back of the housing.

In some embodiments, the MDC adapter disposed in the front opening formed in the front of the housing extends forward beyond the first module features.

Embodiments of the present disclosure can include or more or any combination of the above features and elements.

This brief summary is provided solely as an introduction to subject matter that is fully described in the detailed description. This brief summary should not be considered to describe essential features nor be used to determine the scope of the claims. Moreover, it is to be understood that both the foregoing summary and the following detailed description are exemplary and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2A is a top view of a tray component of the optical fiber assembly of FIG. 1A;

DETAILED DESCRIPTION

Figure 1A:
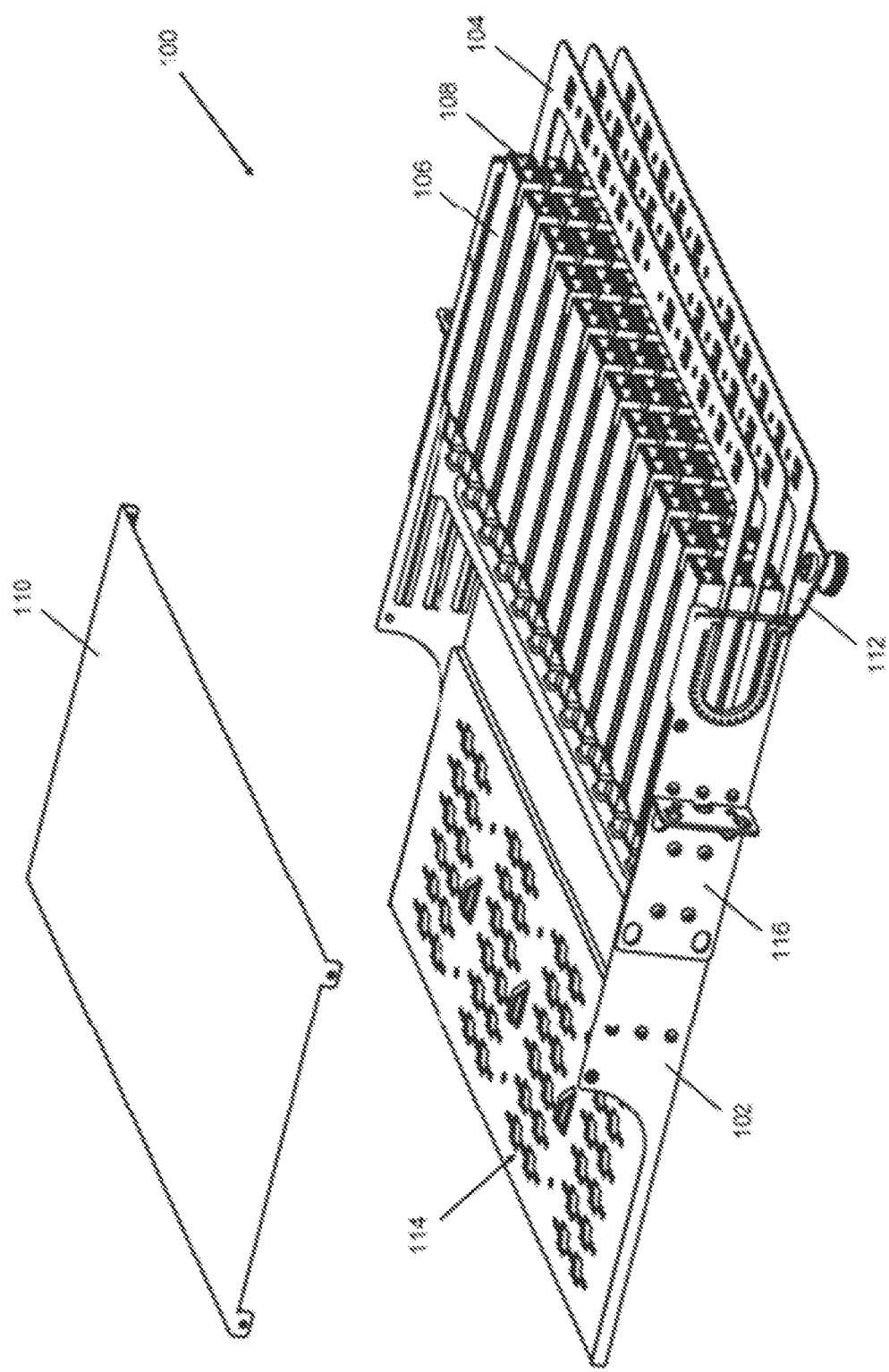
FIG. 1A is a front and left side perspective view of an optical fiber assembly in accordance with the present disclosure.

Before explaining one or more embodiments of the disclosure in detail, it is to be understood that the embodiments are not limited in their application to the details of construction and the arrangement of the components or steps or methodologies set forth in the following description. In the following detailed description of embodiments, numerous specific details may be set forth to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, the present disclosure provides fiber optic hardware and equipment for accommodating MDC fiber optic connectors to maximize connector density and improve access to the MDC fiber optic connectors to facilitate optical connections. The hardware and equipment disclosed herein includes various MDC modules for handling MDC adapters, MDC connectors and associated cabling, trays for handling the MDC modules, and chassis for handling the trays, to provide individual use components and assemblies including one or more of the aforementioned components. The term "handling" used herein can be used interchangeably with the terms "accommodating" or "utilizing" and is intended to mean that the components and assemblies disclosed herein are compatible for use with MDC fiber optic connectors and corresponding adapters. The assemblies disclosed herein are configured for rack-mounting or other installation environments benefitting from increased connection densities. In addition, the components disclosed herein are compatible for use with other fiber optic hardware and equipment for handling other connector types.

Figure 1B:
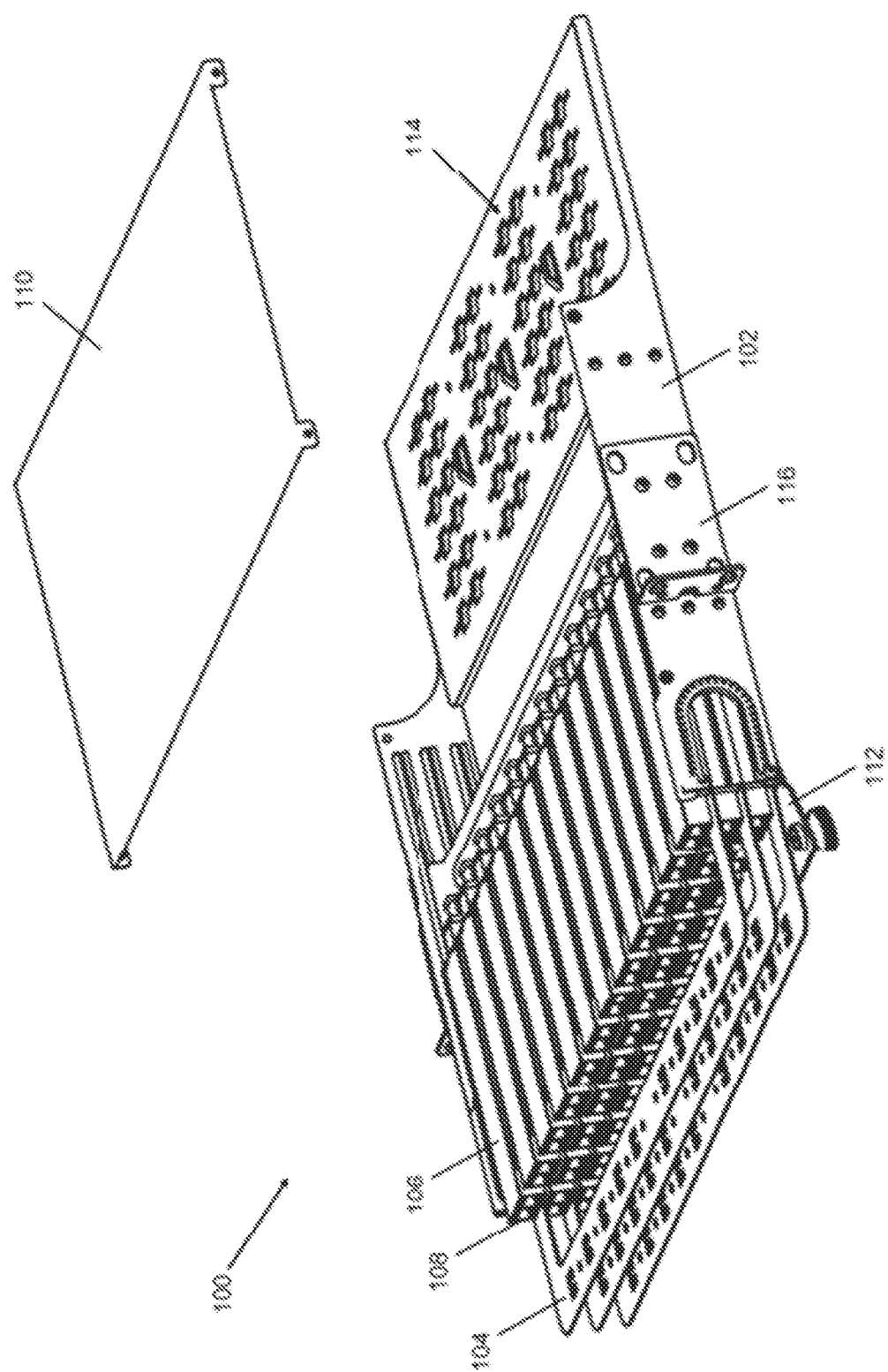
FIG. 1B is a front and right side perspective view of the optical fiber assembly of FIG. 1A.
Figure 1C:
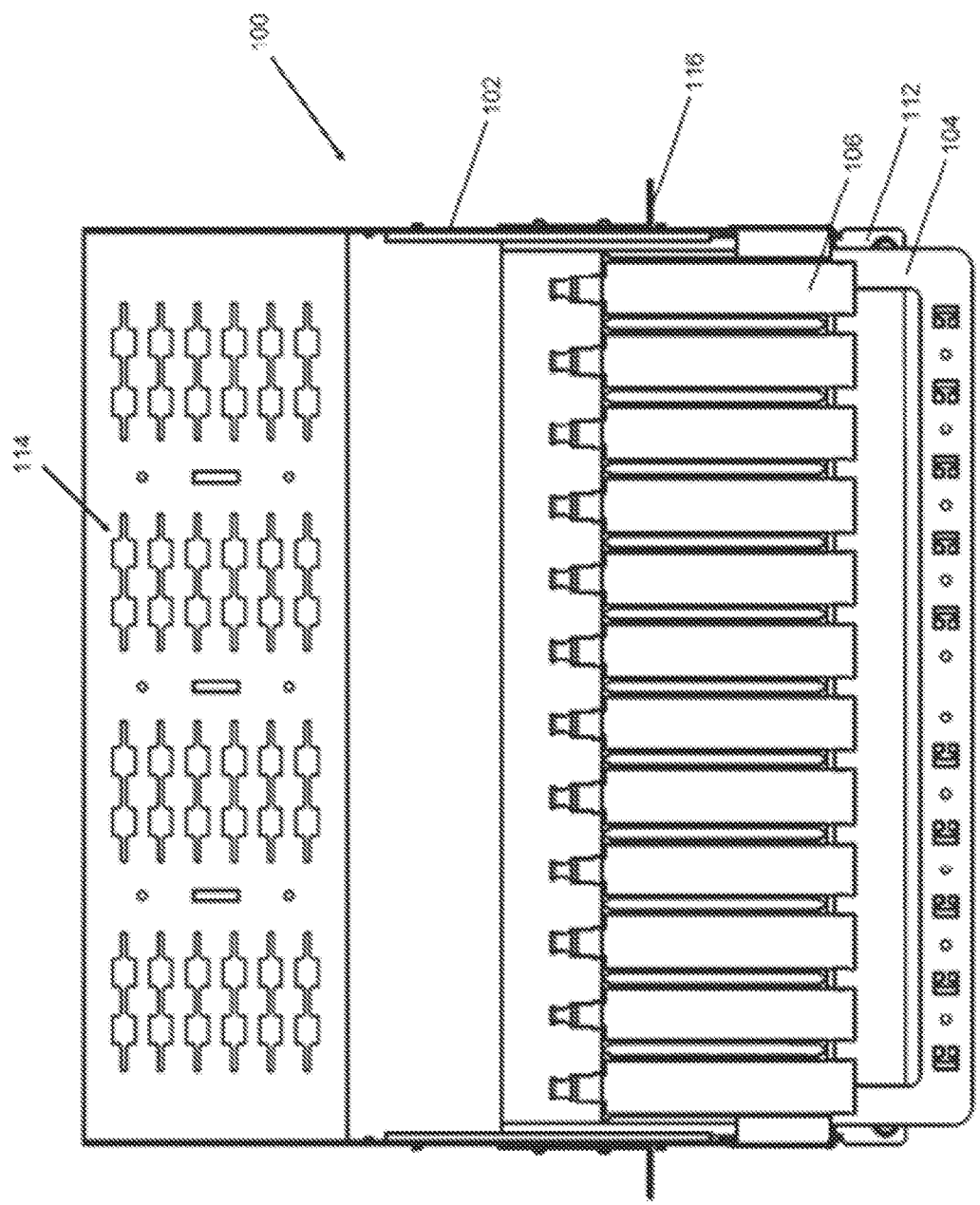
FIG. 1C is a top view of the optical fiber assembly of FIGS. 1A and 1B shown without the top cover.
Figure 8:
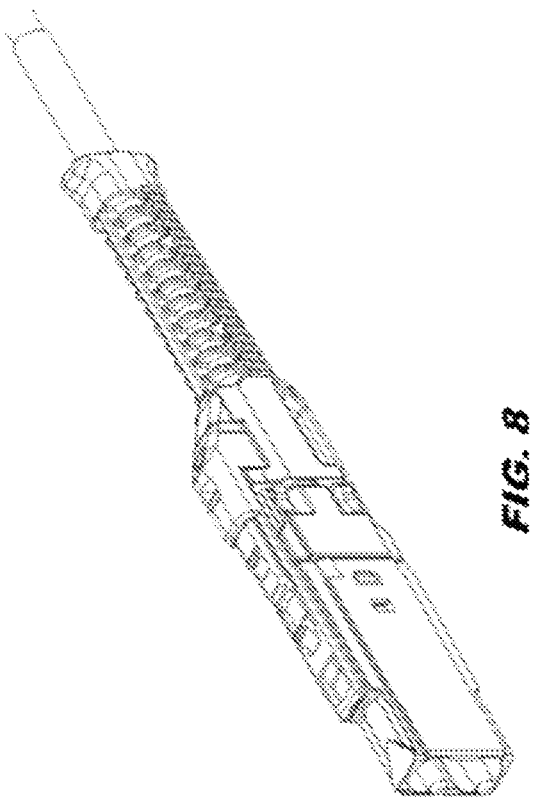
FIG. 8 is a perspective view of a prior art MDC fiber optic connector.

With reference to FIGS. 1A-1C, an optical fiber assembly 100 according to the present disclosure generally includes a rack-mountable chassis 102 or simply "chassis" adapted to mount in a standard width rack, at least one tray 104 slidably disposed in the chassis 102, and at least one MDC module 106 removably installed in the at least one tray 104. Each MDC module 106 is preferably equipped with at least one MDC adapter 108, for instance at least one QSFP or SFP adapter. In some embodiments, each MDC adapter 108 can receive one or more MDC optical connectors (FIG. 8) to make optical connections, each tray 104 can hold a plurality of MDC modules 106, each tray 106 can slide independently in the forward direction, and in some embodiments also in the rearward direction relative to the chassis 102 to provide access to the MDC modules 106 and/or MDC optical connectors at the front of the chassis 102, and the chassis 102 can hold a plurality of vertically stacked sliding trays 104.

In some embodiments, the optical fiber assembly 100 may further include a removable cover 110 (shown detached in FIGS. 1A and 1B) which, when installed, substantially covers the MDC modules 106 when the trays 104 are positioned within the chassis 102, i.e., not slid forward or rearward. In some embodiments, an access door 112 may be hingedly coupled near the front of the chassis 102 such that the access door 112 can be swung open in the downward direction to clear the front opening, for instance to access the sliding trays 104 from the front of the chassis 102. The access door 112 may be held closed via a mechanical coupling, magnetic coupling, or other suitable coupling for holding the access door 112 closed against the front face of the chassis 102.

The chassis 102 may be fabricated from metal or other material. The chassis 102 generally includes a front, back, top, bottom and opposing left and right sidewalls forming an interior space. The back of the chassis 102 includes cable management features 114, for instance cable tie downs and/or slide-lock engagement features for receiving and securing in place furcation clips. Mounting brackets 116 affixed to the exterior sidewalls can be used to mount the assembly 100 within/to a rack, for instance a standard 1 rack unti (1 U) 19-inch server rack.

Figure 2B:
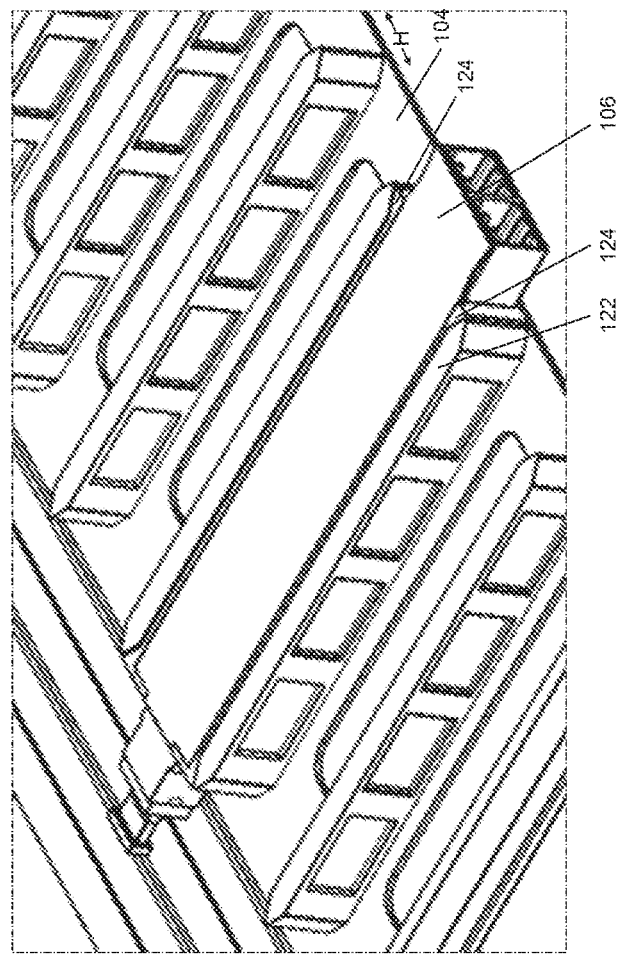
FIG. 2B is a detailed perspective view of the tray component of FIG. 2A showing an installed MTP module in accordance with the present disclosure.
Figure 2C:
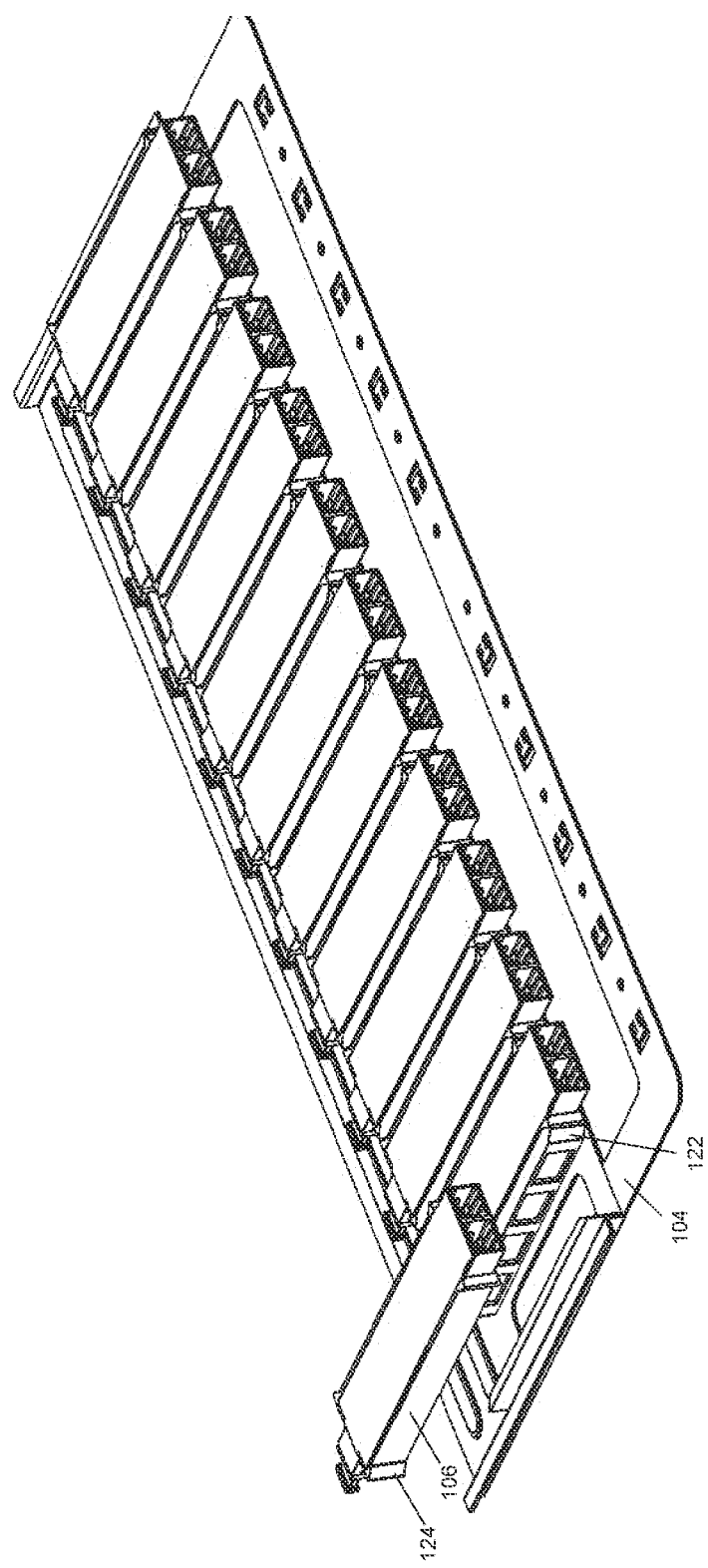
FIG. 2C is a perspective view of the tray component of FIG. 2A showing a plurality of installed MTP modules installed in the tray component and a single MTP module removed from the tray component.

With reference to FIGS. 2A-2C, each tray 104 is configured to receive and hold at least one MDC module 106, and preferably a plurality of MDC modules 106 in a parallel, side-by-side positional relationship. Each MDC module may be of a predetermined type as discussed further below, and all MDC modules within a tray 104 may be of the same configuration or different configurations. In some embodiments, each tray 104 forms a pull/push handle 116 positioned at its forward end for selectively manipulating the tray 104 relative to the chassis. For example, each tray 104 can be moved (e.g., pulled) from its starting or operative position to its forward or access position by pulling on the handle 116 to slide the tray forward, and each tray can be moved (e.g., pushed) from its forward or access position to its starting or operative position by pushing on the handle 116 to slide the tray rearward. In embodiments in which the trays 104 are also or alternatively movable rearward within the chassis 102, each tray 104 can be moved (e.g., pushed) from its starting or operative position to its rearward or access position by pushing on the handle 116 to slide the tray rearward, and each tray can be moved (e.g., pulled) from its rearward or access position to its starting or operative position by pulling on the handle 116 to slide the tray forward. As discussed below, the trays are preferably configured to register in their starting or operative position. Each tray handle 116 may include integrated cable management features 118.

Each tray 104 preferably defines a plurality of MDC module spaces 120 or positions formed between adjacent ones of upstanding vertical walls forming guides 122. As shown in FIG. 2A, the tray 104 forms twelve MDC module spaces 120 for holding twelve MDC modules 106. Other configurations are possible and envisioned including, for example, a single space, two spaces, four spaces, six spaces, more than twelve spaces and any other number of spaces. Each space has a width dimension W generally corresponding to the width of the MDC module, a length dimension L generally corresponding or slightly less than the length of the MDC module, and a height dimension H generally corresponding to the height of the MDC module.

Each MDC module 106 is received within an MDC module space 120 formed between two adjacent guides 122. Each guide 122 extends horizontally along a portion of the tray 104 from front-to-back, and vertically upward from a floor of the tray 104 to a height substantially corresponding to the height or thickness of the MDC modules 106. The guides 122 are positioned parallel and spaced-apart. Each guide 122 has a predefined shape complementary to the shape of the module sidewall to be positioned alongside or engaging the guide 122. As shown, each interior guide 122 has tapering front and back ends and is symmetrical about its longitudinal axis. Each exterior guide, i.e., positioned at the lateral ends of the tray 104 proximate the chassis sidewalls, may be one-half of an interior guide as each exterior guide engages only module 106 while each interior guide engages two adjacent modules 106.

Each guide 122 functions to guide vertical installation and removal of the MDC modules 106 while preventing relative movement between the installed modules 106 and the tray 104. Specifically, each MDC module 106 installs into its respective space 120 from above the tray 104 by 'dropping' into the tray. Each module 106 has a front end and a back end forming protruding lateral features 124 provided proximate the four corners of the MDC module 106 positioned to align with the tapering front and back ends of the guides 122. Each guide 122 has a length dimensioned to fit in the space between the front and back protruding lateral features 124 along one side of a module 106. The complementary shapes of the guides 122 and the protruding lateral features 124, for instance the opposite tapered features, serve to align the MDC modules 106 in the tray 104 in a side-by-side parallel alignment while preventing relative movement between the modules and tray in all directions other than the vertical direction. In other words, because of the interaction between the aligned guides 122 and the protruding lateral features 124, installed MDC modules 106 cannot be pulled forward relative to the tray 104, pushed backward relative to the tray 104, moved laterally relative to the tray 104, or rotated relative to the tray 104. Installed MDC modules 106 therefore can only be moved vertically into or out of their respective position in the tray 104 and no retention mechanism, e.g., latch or the like, is needed to retain the MDC modules 106 in place. In some embodiments, an interference fit is provided between each MDC module sidewall and its respective adjacent guide for functioning to maintain the MDC module 106 in place. MDC modules 106 can be removed from their respective space 120 by pulling the module from above or pushing the module from below, for instance via access through the underlying opening 125 formed in the floor of the tray 104, wherein each space 120 is provided with at least one opening 125.

Although specific MDC module feature shapes and feature positions along the sides of the MDC modules are shown for interacting with corresponding shapes and positions on the guides 122, it is intended and envisioned that other corresponding shapes and positions can be practiced to permit relative movement in only the vertical direction for module installation and removal. For example, shapes may include, but are not limited to, angled features, curved features, and combinations thereof. With specific reference to FIGS. 2B and 2C, when installed in its respective space, the forward end of the MDC module 106 extends forward of the tray floor, and preferably into the space formed in the tray positioned between the forward end of the floor and rearward end of the formed handle.

Figure 3A:
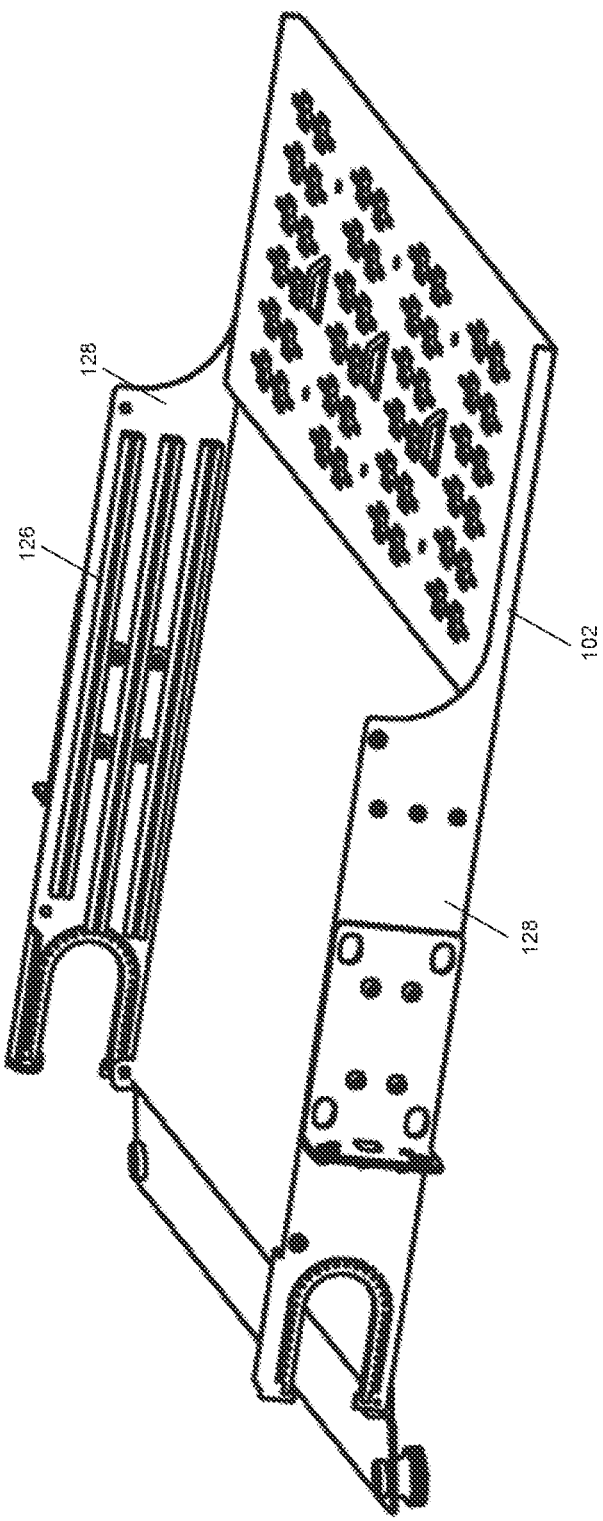
FIG. 3A is a perspective view of a chassis component of the optical fiber assembly of FIG. 1A.
Figure 3B:
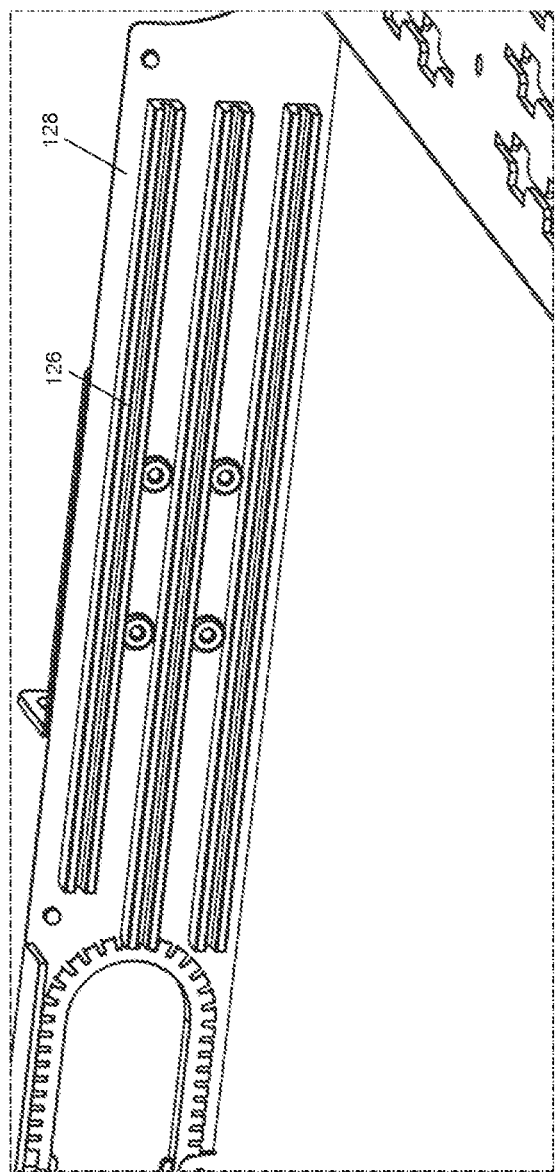
FIG. 3B is a detailed perspective view of the sidewall portion of the chassis component of FIG. 3A showing the plurality of tray guide tracks.
Figure 4A:
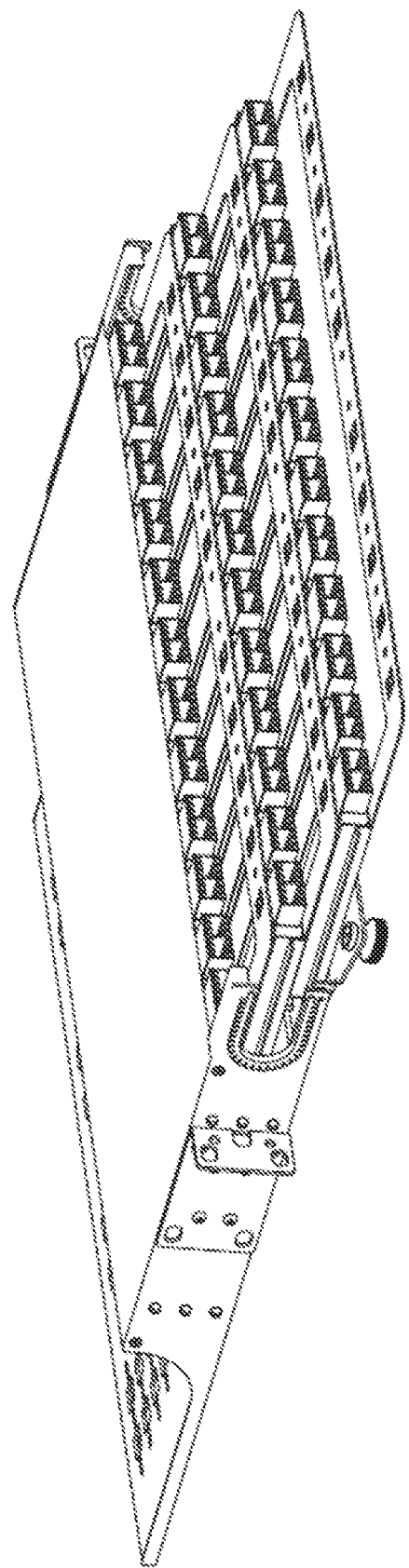
FIG. 4A is a front and left side perspective view of the assembly of FIG. 1A showing independent tray movement in the forward direction.
Figure 4B:
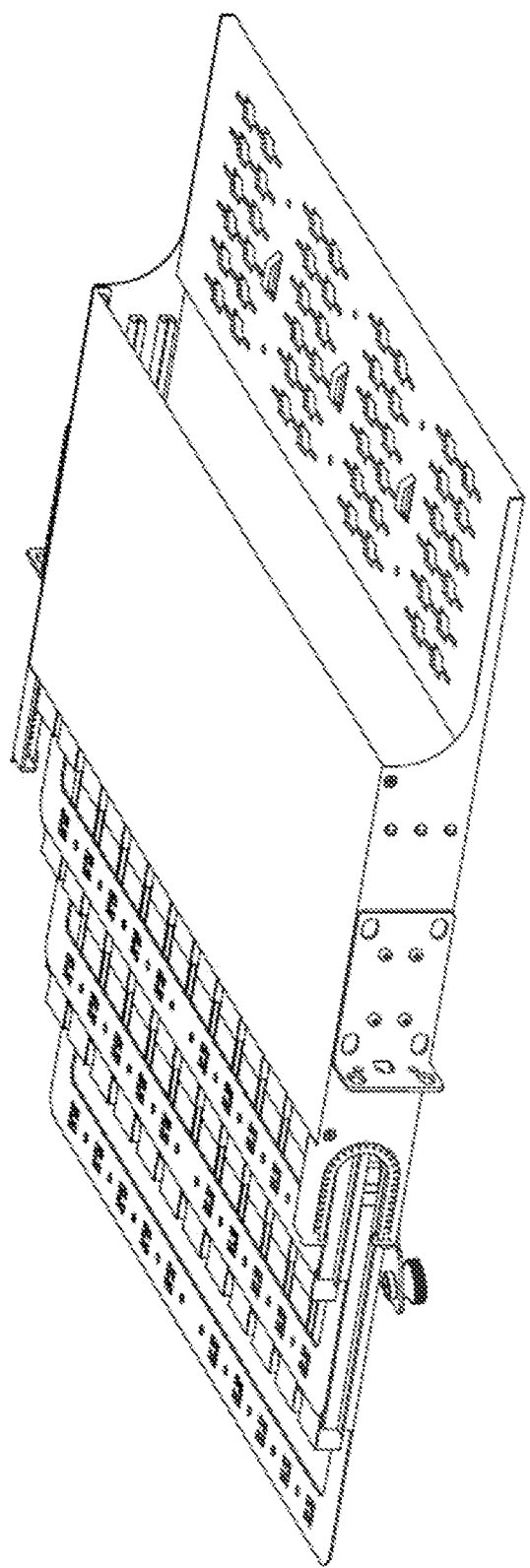
FIG. 4B is a back and right side perspective view of the assembly of FIG. 4A.

With reference to FIGS. 3A and 3B, the chassis 102 is provided with at least one pair of elongate guide tracks 126, and preferably a plurality of pairs of elongate guide tracks 126 affixed to the interior of the left and right sidewalls 128 of the chassis. Each tray is configured to interact with a pair of the elongate guide tracks 126 to guide selective sliding movement (e.g., horizontal translation) of the trays between any of their forward, rearward and operative positions. Each tray is guided by a pair of the elongate guide tracks 126 symmetrically arranged on the interior of the left and right sidewalls 128. In some embodiments, the elongate guide tracks 126 are vertically stacked to accommodate a corresponding number of vertically stacks trays, for instance three sets of guide tracks 126 as shown to guide translation of three separate trays, to provide a single chassis with multiple sliding trays. In some embodiments, the guide tracks 126 may be C-shaped with their open side facing the interior of the chassis 102 such that trays engage their respective guide tracks through the front or rear of the guide tracks. A stop feature may be provided at each of the terminal ends of the guide tracks 126 for preventing a tray from being pulled apart from its respective guide tracks in either direction. Alternatively, each tray may include an anti-separation feature that engages with a feature on the guide-tracks 126. Each tray includes a rail formed along a lateral side that slidably engages in one of the guide tracks 126. FIGS. 4A and 4B shown independent tray 104 translation in the forward direction, and to varying degrees.

Figure 5A:
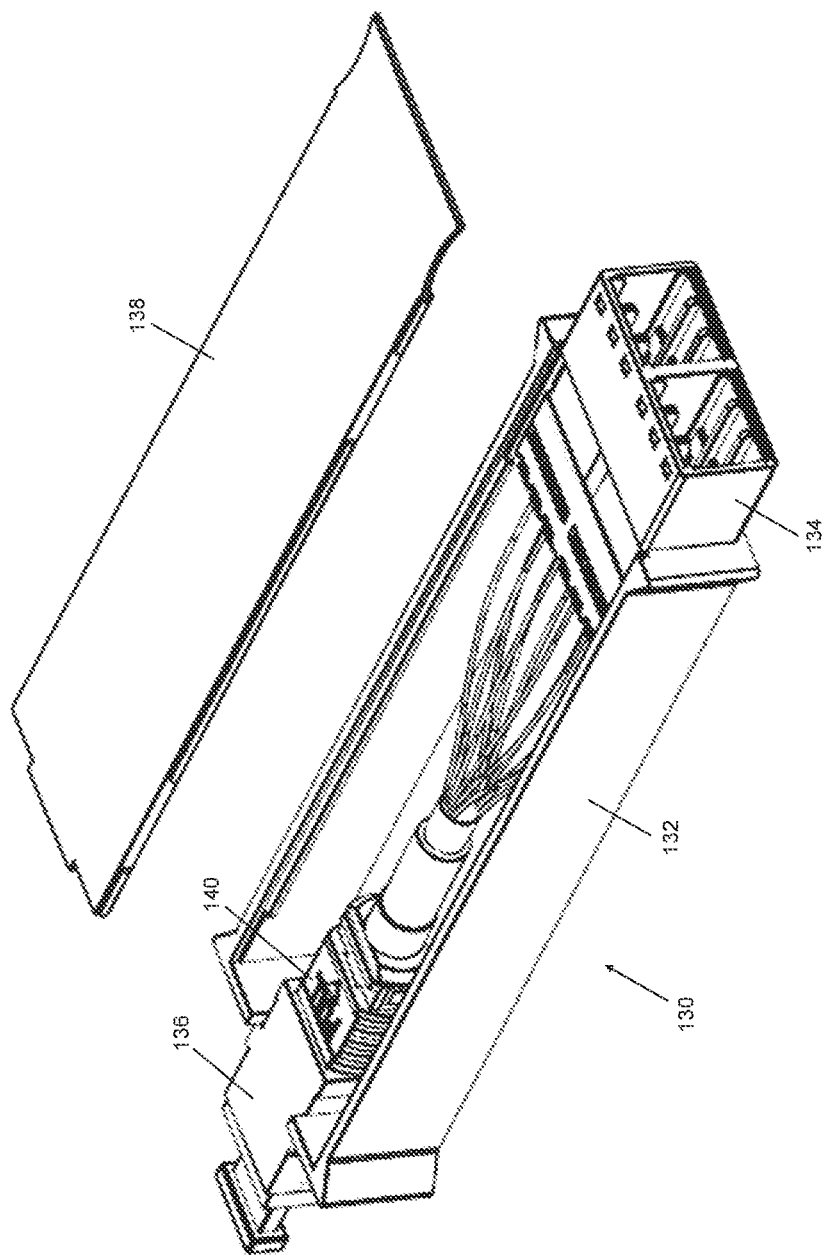
FIG. 5A is a front and left side perspective view of an MDC/MTP module in accordance with the present disclosure.
Figure 5B:
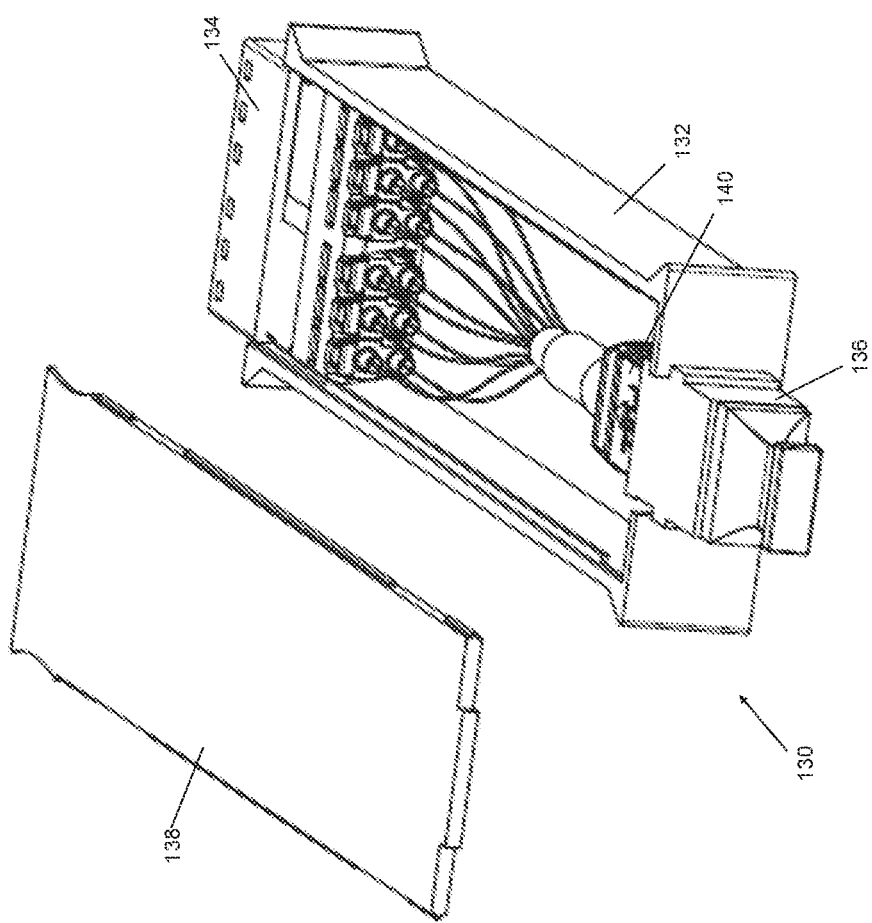
FIG. 5B is a back and right side perspective view of the MDC/MTP module of FIG. 5A.
Figure 9B:
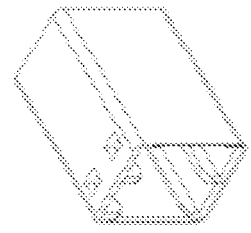
FIG. 9B is a perspective view of a prior art SFP adapter.
Figure 9A:
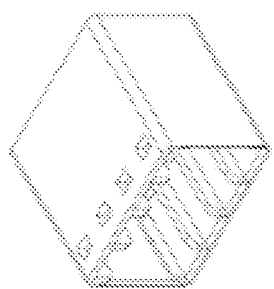
FIG. 9A is a perspective view of a prior art QSFP adapter.

With reference to FIGS. 5A and 5B, a first embodiment of an MTP module 130 according to present disclosure includes a housing 132 having a front, a back, a top, a bottom and opposing sidewalls forming an interior space. At least one opening provided at the front of the housing 132 is configured to receive at least one MDC adapter 134, for instance an MDC adapter as shown in FIG. 9A or 9B. At least one opening provided at the back of the housing 132 is configured to receive an adapter, for instance an MTP adapter 136 for receiving mating multi-fiber connectors. In some embodiment, the housing 132 has an open top provided with a removable cover 138 configured to secure to the housing 132 to close the open top, for instance via interacting features, an interference fit, or the like.

As shown, an MTP connector 140 is received in the 'front' of the MTP adapter 136 on the inside of the housing 132 and optical fibers having connectorized ends are routed with the interior space and received in the 'back' of the MDC adapter 134 in the inside of the housing 132. The MTP module 130 therefore serves to optically connect the optical fibers of MDC connectors received on the front of the MDC module 130 with optical fibers of an MTP connector received on the back of the MDC module 130, to perform optical connections. The MDC adapter 134 may include any number of ports, for instance the six ports as shown provided in two groups of three ports each providing a total of twelve optical connections. Other port and adapter configurations are intended and envisioned providing any desired number of optical connections. The MTP adapter 136 and at least one MDC adapter 134 may be installed in their respective openings from above, and retained in place via interference fit or interacting features.

Figure 6A:
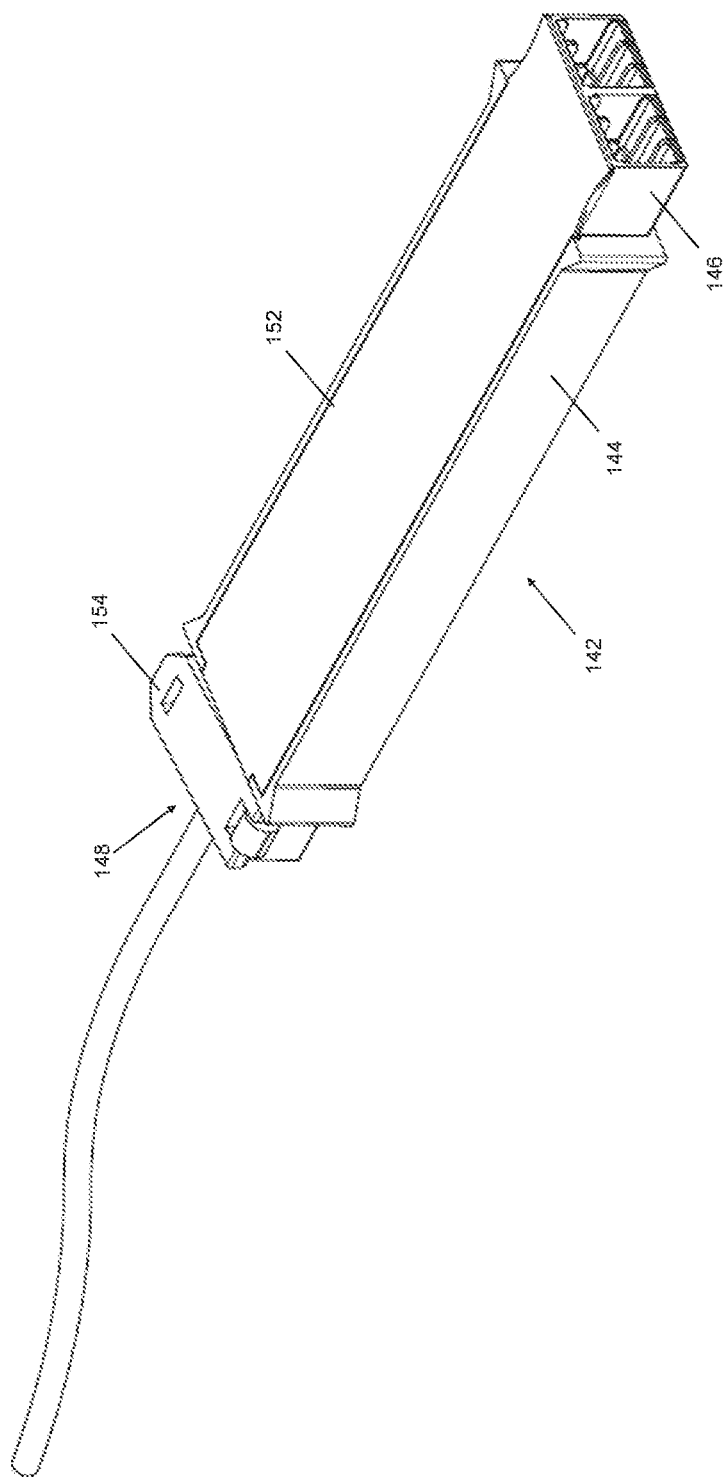
FIG. 6A is a front and left side perspective view of an MDC patching module in accordance with the present disclosure.
Figure 6B:
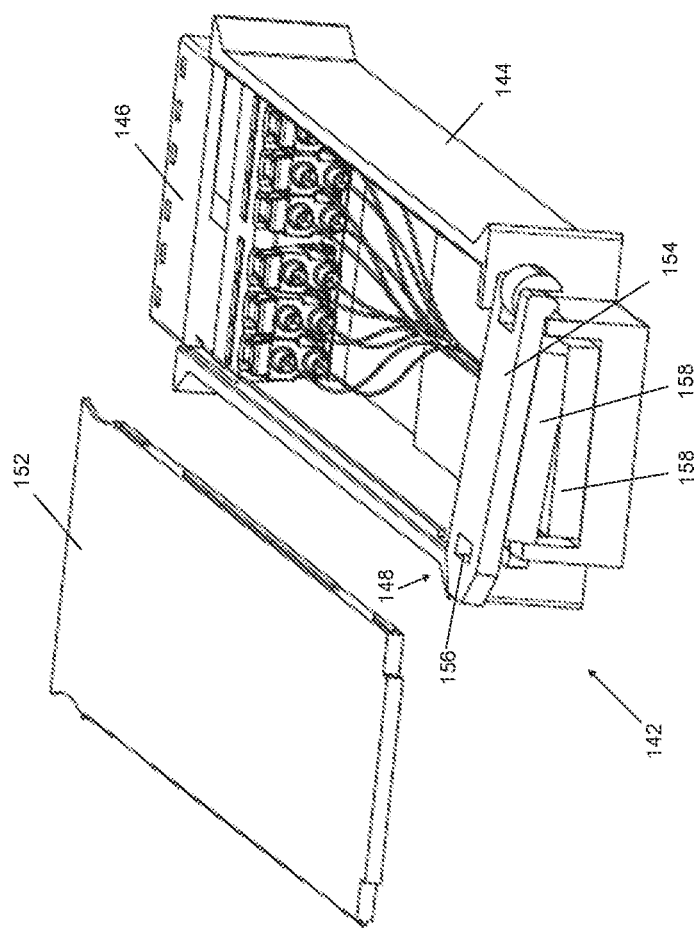
FIG. 6B is a back and left side perspective view of the MDC patching module of FIG. 6A.
Figure 6C:
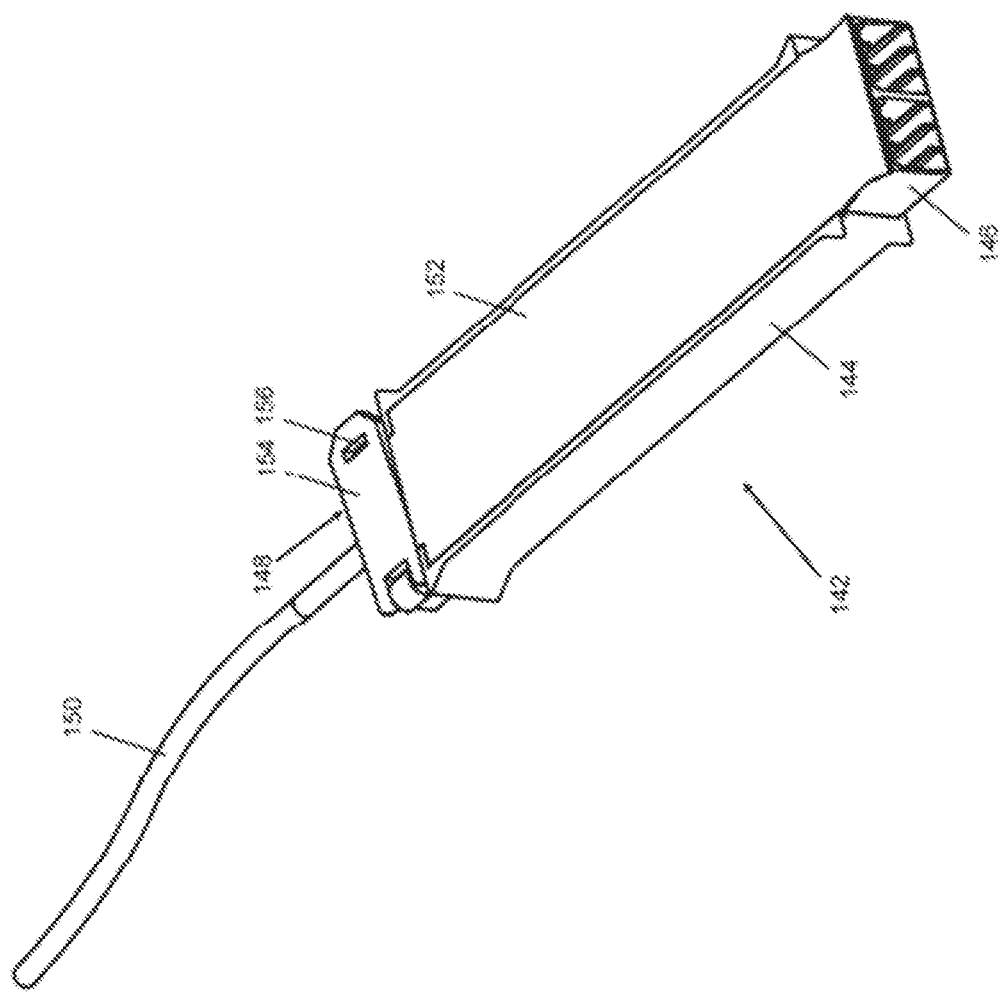
FIG. 6C is a perspective view of an assembled MDC patching module as shown in FIG. 6A.

With reference to FIGS. 6A-6C, another configuration of an MDC module according to the present disclosure includes a patching module 142 including a housing 144 also having a front, a back, a top, a bottom and opposing sidewalls forming an interior space. An opening formed at the front end of the housing 144 is configured to receive an MDC adapter 146, while a cable clamp 148 provided at the back end is configured to clamping around an optical fiber cable 150 entering the housing 144 through the opening formed at the back end of the housing 144. The housing 144 forms an open top and a removable cover 152 secures to the top of the housing 144 to close the open top. In some embodiments, the cable clamp 148 includes a hinged part 154 and a latch 156 for maintaining the hinged part 154 in a closed condition. The cable clamp 148 may be lined with resilient members 158 configured to compress on the entering cable 150 under the force of the closed hinged part 154.

Figure 7A:
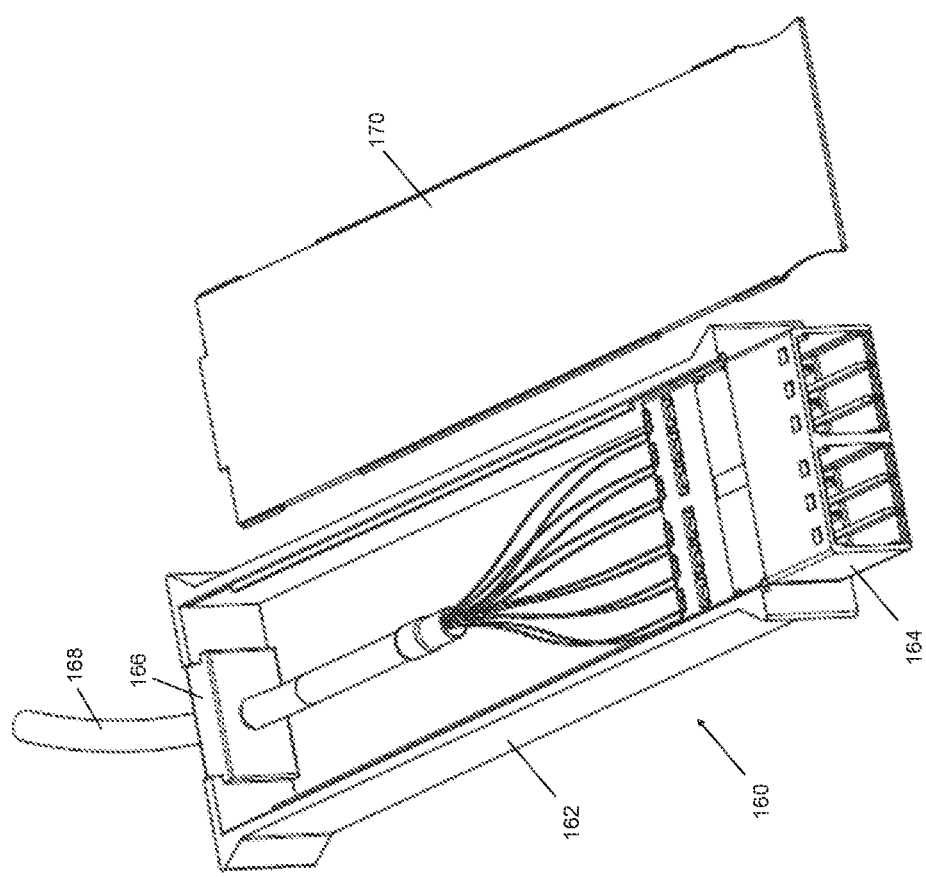
FIG. 7A is a perspective view of a single MDC pre-terminated tailed module in accordance with the present disclosure.
Figure 7B:
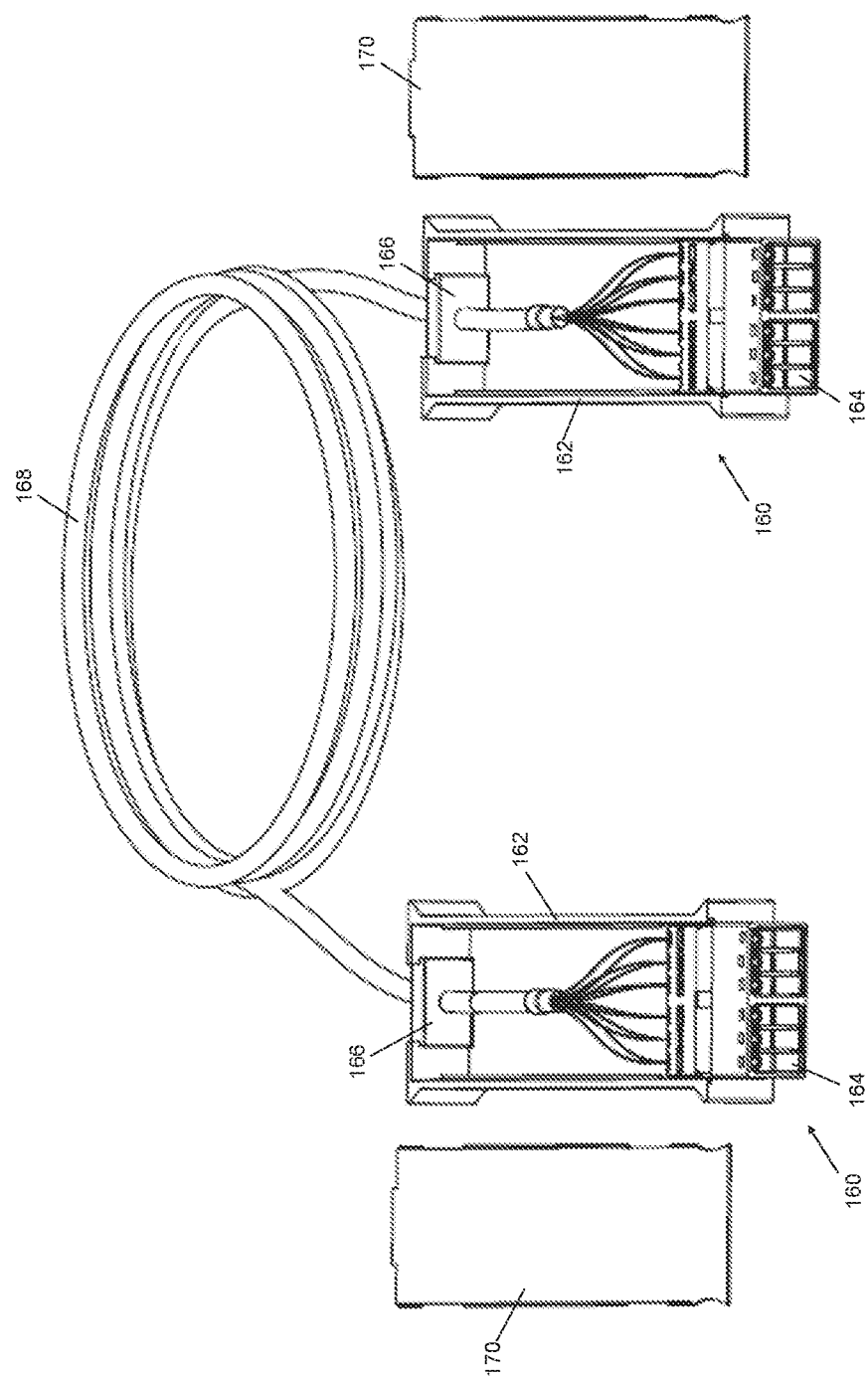
FIG. 7B is a perspective view of an MDC pre-terminated tailed module assembly.

With reference to FIGS. 7A and 7B, another configuration of an MDC module according to the present disclosure includes a pre-terminated tailed MDC module 160 including a housing 162 also having a front, a back, a top, a bottom and opposing sides forming an interior, and having an opening provided at the front of the housing for receiving at least one MDC adapter 164, an opening provided at the back end of the housing 162 receiving a cable guide 166 for guiding a cable 168, an open top, and a removable cover 170 that secures to the top of the housing 162 to close the top. With specific reference to FIG. 7B, in some embodiments, the pre-terminated tailed MDC module 160 is an assembly including separate modules 160 optically coupled via a cable 168 terminating within each of the separate modules. The cable guide 166 provided in the back end surrounds the cable and closes out the back opening.

Optical fiber assemblies according to the present disclosure may include any number of sliding trays, modules per tray, and any port number per adapter. For example, as shown throughout the figures, each MDC adapter is provided with six ports (i.e., 6-ports) divided into two three port (i.e., 3-port) groupings for receiving six (6) MDC optical connectors to provide a total of twelve (12) optical connections per MDC module, trays each configured to hold twelve (12) modules for a total of one hundred and forty-four (144) connections per tray, and three (3) trays per chassis for a total of four hundred and thirty-two (432) optical connections per chassis per rack unit (U) space. Other optical connection configurations are envisioned and possible depending on the chassis height and number of desired optical connections.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A fiber optic assembly for mounting in a rack, comprising:
    a chassis having a top, a bottom, and opposing sidewalls forming an interior space, the interior space accessible through at least a front opening of the chassis;
    a pair of elongate guide tracks provided in the interior space and affixed to the opposing sidewalls;
    a tray disposed in the interior space and slidably engaging the pair of elongate guide tracks such that the tray is configured to horizontally translate relative to the chassis between a first position and at least one second position, the tray having a plurality of mini duplex connector (MDC) module receiving spaces each formed between adjacent ones of guides extending upwardly from a floor of the tray; and
    an MDC module removably installable in one of the plurality of MDC module receiving spaces from above the tray, the MDC module having protruding module features provided near a forward end and a back end thereof for interacting with corresponding guide features formed on respective adjacent ones of the guides forming the MDC module receiving space, the protruding module features and the corresponding guide features preventing, when the MDC module is installed in the respective MDC module receiving space, horizontal translation, lateral translation, and rotational movement of the MDC module relative to the tray;
    wherein the guides and the protruding module features are inflexible; and
    wherein the MDC module can only be moved vertically into or out of the one of the plurality of MDC module receiving spaces.

2. The fiber optic assembly according to claim 1, wherein each of the protruding module features comprises an outwardly tapering feature and each of the corresponding guide features comprises an inwardly tapering feature.

3. The fiber optic assembly according to claim 1, wherein when the MDC module is installed in the respective MDC module receiving space, movement of the MDC module relative to the tray is prevented in all directions with the exception of vertical translation.

4. The fiber optic assembly according to claim 1, wherein the chassis further comprises an access door hingedly coupled near the front of the chassis, the access door configured to be swung open in a downward direction to clear the front opening, and wherein the access door is held in a closed condition against a front face of the chassis via at least one of a mechanical coupling and a magnetic coupling.

5. The fiber optic assembly according to claim 1, wherein the tray comprises a handle formed at a forward end of the tray, the handle spaced apart from the floor of the tray, and the handle configured to move the tray between the first position and the at least one second position.

6. The fiber optic assembly according to claim 1, wherein the first position corresponds to an operative position in which the MDC module is positioned substantially within the interior space of the chassis, and the at least one second position corresponds to an access position in which at least a portion of the MDC module is positioned outside of the interior space of the chassis.

7. The fiber optic assembly according to claim 1, wherein the MDC module comprises:
    a housing having a front, a back, a bottom, a top and opposing sidewalls forming an interior space;
    at least one MDC adapter disposed in a front opening formed in the front of the housing;
    at least one opening formed in the back of the housing; and
    a cover removably attachable to the top of the housing for accessing the interior space of the housing.

8. The fiber optic assembly according to claim 7, further comprising one of a multi-fiber adapter, a cable clamp, and a cable retention feature disposed in the at least one opening formed in the back of the housing.

9. The fiber optic assembly according to claim 1, further comprising:
    a plurality of the pairs of elongate guide tracks provided in the interior space and affixed to the opposing sidewalls, the plurality of pairs of elongate guide tracks arranged in a vertical stack;
    a plurality of the trays disposed in the interior space, wherein each of the plurality of trays slidably engages one of the plurality of pairs of elongate guide tracks, and wherein each of plurality of trays is independently horizontally translatable relative to the chassis; and
    a plurality of the MDC modules removably installable in one of the plurality of MDC module receiving spaces from above.

10. A mini duplex connector (MDC) module for removable installation in an MDC module receiving space formed in a tray, the MDC module comprising:
    a housing having a front, a back, a bottom, a top and opposing sidewalls forming an interior space;
    at least one MDC adapter disposed in a front opening formed in the front of the housing;
    at least one opening formed in the back of the housing;
    a cover removably attachable to the top of the housing for accessing the interior space of the housing; and
    a plurality of protruding module features for interacting with inflexible guide features of guides of the tray;
    wherein the plurality of protruding module features permit vertical installation of the MDC module in the MDC module receiving space, and prevent, when the MDC module is installed in the MDC module receiving space, each of horizontal translation, lateral translation, and rotational movement of the MDC module relative to the tray; and wherein the protruding module features are inflexible such that the module is only capable of being moved vertically into or out of the MDC module receiving space.

11. The MDC module according to claim 10, wherein each of the protruding module features comprises an outwardly tapering feature positioned proximate one corner of the housing.

12. The MDC module according to claim 10, comprising four protruding module features positioned proximate four corners of the housing, each of the four protruding module features tapering outward away from a respective one of the opposing sidewalls such that a middle portion of the housing inward of the front and back ends of the housing is narrower than each of the front and back ends of the housing at the position of the four protruding module features.

13. The MDC module according to claim 10, further comprising a multi-fiber adapter disposed in the at least one opening formed in the back of the housing.

14. The MDC module according to claim 10, further comprising a cable clamp disposed proximate the at least one opening formed in the back end of the housing, the cable clamp comprising a hinged part and a latch for maintaining the hinged part in a closed condition, the cable clamp lined with resilient members configured to compress on an entering cable under a force of the hinged part when in the closed condition.

15. The MDC module according to claim 10, further comprising a resilient cable surround disposed in the at least one opening formed in the back of the housing.

16. The MDC module according to claim 10, wherein the plurality of protruding module features comprises first module features positioned along opposing sides of the housing proximate the front of the housing, and second module features positioned along opposing sides of the housing proximate the back of the housing.

17. The MDC module according to claim 16, wherein the MDC adapter disposed in the front opening formed in the front of the housing extends forward beyond the first module features.

* * * * *